Patented Sept. 3, 1940

2,213,750

UNITED STATES PATENT OFFICE 2,213,750

POLYVINYL ACETAL RESINS

Donald R. Swan, Rochester, N. Y., assignor to Eastman Kodak Company, Rochester, N. Y., a corporation of New Jersey No Drawing. Application December 30, 1938, Serial No. 248,515. In Great Britain March 22, 1938

20 Claims. (Cl. 260—73)

This invention relates to polyvinyl acetal resins and more particularly to polyvinyl acetal resins having improved resistance to moisture.

Simple polyvinyl acetal resins (i. e. those in which the acetal linkages are formed from but one kind of acetal group) have been prepared from polyvinyl alcohols by condensation of aldehydes therewith, in the presence of an acetal condensation catalyst. Simple polyvinyl acetal resins have also been prepared by concomitantly deesterifying a polyvinyl ester and condensing the deesterified product with an aldehyde, in the presence of a deesterification catalyst, the catalyst serving also to accelerate the condensation of the deesterified product with the aldehyde.

The polyvinyl acetal resins prepared from acetaldehyde are probably the most interesting of the polyvinyl acetal resins in which the acetal linkages are formed from a single saturated aliphatic aldehyde. These polyvinyl acetaldehyde acetal resins appeared to be useful for a variety of purposes in the plastics field. For example, such resins can be cast from ordinary simple solutions into the form of transparent film or sheet of fairly low thermoplasticity. However, the film or sheet is too brittle to be adapted commercially to certain uses; for instance the film or sheet is too brittle to serve as a support for light-sensitive photographic coatings. Efforts to decrease the brittleness of such resins by changing the chemical composition thereof, viz. by increasing the hydroxyl group content, have resulted in resins which are too water susceptible to be employed commercially as supports for light-sensitive photographic supports.

Formaldehyde-acetal resins have many properties desirable in plastic materials, but possess a peculiar affinity for the relatively few organic solvents in which they are soluble, which characteristic practically precludes their adaptation to a number of commercial processes. Butyraldehyde acetal resins are fairly thermoplastic substances and their use is, therefore, considerably limited.

I have now found that polyvinyl saturated aliphatic aldehyde acetal resins can be greatly improved, particularly as to lowering of moisture susceptibility and to lowering of thermoplasticity without inducing brittleness, by introducing halogenated (particularly chlorinated) saturated aliphatic aldehyde acetal groups into the resins, so that all or part of the acetal linkages in the resin are formed from halogenated saturated aliphatic aldehyde acetal groups. The halogenated saturated aliphatic aldehyde acetal groups in my new resins can contain one or two halogenated atoms in the alpha position, i. e., on the carbon atom adjacent to the

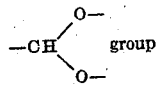

group

My new resins, particularly those in which the acetal linkages are formed in part from acetaldehyde, propionaldehyde or butyraldehyde acetal groups and in part from monochlor acetaldehyde acetal groups, are advantageously employed in the manufacture of film or sheet support for light-sensitive photographic coatings. Those of my new resins in which the acetal linkages are formed in part from acetaldehyde acetal groups and in part from monochlor acetaldehyde acetal groups are especially advantageously employed for such a purpose.

It is, accordingly, an object of my invention to provide new polyvinyl saturated aliphatic aldehyde acetal resins in which all or part of the acetal linkages are formed from alpha mono or dihalogenated saturated aliphatic aldehyde acetal groups. It is a further object of my invention to provide a process for preparing such new resins. A further object is to provide film or sheet of such new resins. Other objects will become apparent upon a complete perusal of this specification.

I have found that ten or more mole per cent of the acetal linkages in my new resins are advantageously formed from halogenated saturated aliphatic aldehyde acetal groups, although beneficial effects are obtained with much smaller amounts e. g. five mole per cent.

According to my invention, I prepare my new resins by condensation of an alpha mono- or dihalogenated saturated aliphatic aldehyde with a polyvinyl alcohol, in the presence of an acetal condensation catalyst. More advantageously I prepare my new resins by concomitantly deesterifying a polyvinyl ester and condensing the deesterified product with an alpha mono- or dihalogenated saturated aliphatic aldehyde, in the presence of an acid deesterification catalyst. Of course, when preparing those of my new resins which contain saturated aliphatic aldehyde acetal groups other than halogenated saturated aliphatic aldehyde acetal groups, I react also a saturated aliphatic aldehyde or its derivative, e. g. its simple acetal, with the polyvinyl alcohol or ester. Where such different aldehydes are employed, I have found that the different aldehydes can be reacted simultaneously or successively. I have found it advantageous to employ simple acetals of the halogenated aldehydes rather than the free aldehyde. I have also found it advantageous to employ, instead of the halogenated aldehydes, dihalogenethers.

While the process of my invention is subject to variation particularly as to the nature and quantity of the polyvinyl alcohol or polyvinyl ester employed, the nature and quantity of the aldehydes, simple acetals or halogenethers employed, the catalysts employed, the deesterifying agent (if any) employed, the temperatures employed, and the methods of isolating and purifying the resins, the following examples will serve to illustrate my invention. These examples are not intended to limit my invention. In these examples the viscosities stated for the polyvinyl esters are the viscosities in centipoises of their molar (86.05 grams per liter, in the case of polyvinyl acetate) solutions in benzene, at about 20° C.

EXAMPLE 1.—*Polyvinyl monochloracetaldehyde acetal resin*

80 g. (.93 mol.) of polyvinyl acetate (viscosity 30) were dissolved in 60 g. ethyl acetate and 90 g. of 95% ethyl alcohol. To this solution were added with stirring 100 g. (.66 mol.) of the diethyl acetal of monochloracetaldehyde and 15 g. of sulfuric acid (concentrated) dissolved in 32 cc. of water. The resulting mixture was heated at about 70° C. for about 8 hours with stirring. The reaction mixture was then cooled to ordinary temperature and diluted with twice its volume of 1,4-dioxane plus sufficient ammonium hydroxide to neutralize the sulfuric acid present. The diluted reaction mixture was then poured into well agitated cold water to precipitate the resin. The resin was thoroughly washed with cold water and then dried at about 50° C. The resin was soluble in acetone, in butyl alcohol and in chlorinated hydrocarbons. It did not disperse in methyl or ethyl alcohols. The resin contained an acetate group content equivalent to about 9.5 percent by weight of polyvinyl acetate and a hydroxyl group content equivalent to about 9.57 percent by weight of polyvinyl alcohol. 19.7 percent by weight of the resin was due to chlorine. All of the acetal linkages in this resin are formed from monochloracetaldehyde acetal groups which have the following formula:

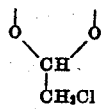

In preparing this resin, an excess of about 0.2 mol. or about 40% of the diethyl acetal of monochloracetaldehyde was employed.

EXAMPLE 2.—*Polyvinyl monochloracetaldehyde acetal resin*

107 g. (1.2 mol.) of polyvinyl acetate (viscosity 30) were dissolved in 85 g. of ethyl acetate and 113 g. of 95% ethyl alcohol. To this solution were added with stirring 100 g. (.55 mol.) of the diethyl acetal of monochloracetaldehyde and 7.5 cc. of concentrated sulfuric acid dissolved in 16 cc. of water. The resulting mixture was heated at about 70° C. for about 8 hours with stirring. The reaction mixture was then cooled to ordinary temperatures and diluted wtih twice its volume of 1,4-dioxane plus sufficient ammonium hydroxide to neutralize the sulfuric acid present. The diluted reaction mixture was then poured into well agitated cold water to precipitate the resin. The resin was thoroughly washed with cold water and then dried at about 50° C. The resin was soluble in acetone, butyl alcohol and in chlorinated hydrocarbons. It did not disperse in methyl or ethyl alcohol. The resin contained an acetate group content equivalent to about 11 per cent by weight of polyvinyl acetate and a hydroxyl group content equivalent to about 15.4 per cent by weight of polyvinyl alcohol. 15 per cent by weight of the resin was due to chlorine. All of the acetal linkages in this resin are formed from monochloracetaldehyde acetal groups. In preparing this resin only a slight excess of the diethyl acetal of monochloracetaldehyde was employed.

In a manner similar to that illustrated in the foregoing two examples polyvinyl monobromacetaldehyde acetal resins can be prepared using the simple acetals, e. g. the diethyl acetal of monobromacetaldehyde.

EXAMPLE 3.—*Polyvinyl acetaldehyde-monochloracetaldehyde acetal resin*

200 g. (2.3 mol.) of polyvinyl acetate were dissolved in 300 cc. of methanol (methyl alcohol). To this solution were added with stirring 300 g. (1.95 mol.) of the diethyl acetal of monochloracetaldehyde and 18 g. (.4 mol.) of paraldehyde (polymerized acetaldehyde) and 50 cc. of hydrochloric acid (sp. g. 1.18). The resulting mixture was allowed to stand about 5 days at about 40° C. At the end of this time, the reaction mixture was diluted with about twice its volume of acetone. The diluted reaction mixture was then poured into cold water to precipitate the resin. The resin was thoroughly washed with water and dried at about 50° C. The resin was soluble in acetone, but did not disperse in methyl alcohol. The resin contained an acetate group content equivalent to about 3.4 per cent by weight of polyvinyl acetate and a hydroxyl group content equivalent to about 3.8 per cent by weight of polyvinyl alcohol. 15.7 per cent by weight of the resin was due to chlorine. Of the total acetal groups in the resin about 65 mole per cent were monochloracetaldehyde acetal groups which have the formula:

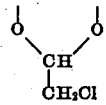

while about 35 mole per cent were acetaldehyde acetal groups which have the formula:

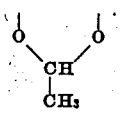

In preparing this resin, the total diethyl acetal of monochloracetaldehyde plus the paraldehyde was 2.35 mol. or about 100% excess.

EXAMPLE 4.—*Polyvinyl acetaldehyde-monobromacetaldehyde acetal resin*

22 g. (.5 mol.) of polyvinyl alcohol were dispersed in 125 g. of 1,4-dioxane. To this solution were added 45 g. (.24 mol.) of the diethyl acetal of monobromacetaldehyde and 11 g. (.25 mol.) of paraldehyde, 10 cc. of hydrochloric acid (sp.

g. 1.18) and 0.1 g. of sodium nitrite. The resulting mixture was allowed to stand about 48 hours at about 40° C. At the end of this time, the reaction mixture was diluted with thrice its volume of acetone. The diluted reaction mixture was poured into cold water to precipitate the resin. The precipitated resin was thoroughly washed with water and dried at 55° C. The resin was readily soluble in 1,4-dioxane, acetone and chlorinated hydrocarbons. The resin contained a hydroxyl group content equivalent to about 5.3% by weight of polyvinyl alcohol. 13.5% of the weight of the resin was due to bromine. Of the total acetal groups in the resin, about 33 mole per cent were monobromacetaldehyde acetal groups having the formula:

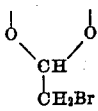

while about 67 per cent by moles were acetaldehyde acetal groups having the formula:

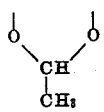

In preparing this resin the total diethyl acetal of monobromacetaldehyde plus the paraldehyde were about 0.5, an excess of about 100%. The sodium nitrite used in this example was for the purpose of improving stability of the finished resin.

EXAMPLE 5.—*Polyvinyl acetaldehyde-monochloracetaldehyde acetal resin*

100 g. (1.2 mol.) of polyvinyl acetate (viscosity 25) were dissolved in 325 cc. of ethyl alcohol. To this solution were added with stirring, 74 g. (0.5 mol.) of the diethyl acetal of monochloracetaldehyde, 72 g. (1.6 mol.) of paraldehyde and 25 cc. of hydrochloric acid (sp. g. 1.18). The resulting mixture was allowed to stand for about 5 days at about 40° C. At the end of this time, the reaction mixture was diluted with about twice its volume of acetone. The diluted mixture was poured into cold water to precipitate the resin. The resin was thoroughly washed with cold water and dried at about 50° C. The resin was soluble in n-butanol and in acetone, but did not disperse in methyl alcohol. The resin was, however, soluble in a mixture of one volume of acetone and three volumes of methyl alcohol. The resin contained an acetate group content equivalent to about 1.9 per cent by weight of polyvinyl acetate and a hydroxyl group content equivalent to about 6.8 per cent by weight of polyvinyl alcohol. 3 per cent of the weight of the resin was due to chlorine. Of the total acetal linkages, about 11.4 mole per cent were due to chloracetaldehyde acetal groups. In preparing this resin the combined molecular proportions of the diethyl acetal of monochloracetaldehyde and paraldehyde employed were equal to 2.1 mol., an excess of over 200%.

EXAMPLE 6.—*Polyvinyl acetaldehyde-monochloracetaldehyde acetal resin*

100 g. (1.2 mol.) of polyvinyl acetate (viscosity 25) were dissolved in 300 cc. of 95% ethyl alcohol. To this solution were added 111 g. (.7 mol.) of the diethyl acetal of monochloracetaldehyde, 42 g. (1 mol.) of paraldehyde and 25 cc. of concentrated hydrochloric acid (sp. g. 1.18). The resulting mixture was allowed to stand at about 40° C. for about 5 days. At the end of this time, the reaction mixture was diluted with about twice its volume of acetone. The diluted reaction mixture was poured into cold water to precipitate the resin. The precipitated resin was thoroughly washed with water and dried at about 50° C. It was soluble in n-butyl alcohol and in acetone, but did not disperse in methyl alcohol. The resin, however, was soluble in a mixture of three volumes of methyl alcohol and one volume of acetone. The resin contained an acetate group content equivalent to about 1.7 per cent by weight of polyvinyl acetate and a hydroxyl group content equivalent to about 8.9 per cent by weight of polyvinyl alcohol. 12 per cent of the weight of the resin was due to chlorine. Of the total acetal linkages, about 51 mole per cent were due to chloracetaldehyde acetal groups. In preparing this resin, the total moles of the diethyl acetal and the paraldehyde were 1.7, an excess of over 200%.

EXAMPLE 7.—*Polyvinyl acetaldehyde-chloracetaldehyde acetal resin*

200 g. (2.3 mol.) of polyvinyl acetate (viscosity 25) were dissolved in 600 cc. of 95% ethyl alcohol. To this solution were added with stirring 36 g. (.25 mol.) of α,β-dichlorethyl ethyl ether, 42 g. (1 mol.) of paraldehyde and 25 cc. of hydrogen chloride. The resulting solution was allowed to stand at about 40° C. for about 6 days. The reaction mixture was then diluted with about twice its volume of acetone. The diluted reaction mixture was poured into water to precipitate the resin. The precipitated resin was thoroughly washed with cold water and dried at about 50° C. The resin was particularly white in appearance. It was soluble in acetone and in n-butyl alcohol. It did not disperse in methyl alcohol or in ethyl alcohol at ordinary temperatures. It contained an acetate group content equivalent to about 1.8 per cent by weight of polyvinyl acetate and a hydroxyl group content equivalent to about 15.1 per cent by weight of polyvinyl alcohol, 1.7 per cent of the weight of the resin was due to chlorine. Of the total acetal linkages in the resin, about 6.7 mole per cent were formed for monochloracetaldehyde acetal groups. In preparing this resin only a slight excess of paraldehyde and dichlorether were employed.

As illustrated above, polyvinyl propionaldehyde-chloracetaldehyde acetal resins can be prepared by employing the diethyl acetal of monochloracetaldehyde with propionaldehyde. Polyvinyl butyaldehyde-chloracetaldehyde acetal resins can be prepared by employing the diethyl acetal of mono-chloracetaldehyde with butyraldehyde. Polyvinyl propionaldehyde-monobromacetaldehyde acetal and polyvinyl butyraldehyde-monobromacetaldehyde acetal resins can be similarly prepared. Polyvinyl α,β-dichlorobutyraldehyde acetal resins can be prepared as illustrated in Examples 1 and 2 by employing the diethyl acetal of α,β-dichlorobutyraldehyde.

Heat accelerates the formation of my new resins, but temperatures over 70° C. are advantageously avoided. Most advantageously a temperature of about 40° C. is employed. A temperature range of 20° to 50° C. is preferred.

As acid deesterification catalysts, mineral acids are advantageously employed. Hydrochloric acid is most advantageously employed, since the resins obtained when it is employed are ordinarily more stable than those obtained when sulfuric acid is employed for example. Trichloracetic acid or organic sulfonic acids can also be used.

As acetal condensation catalysts, acids, particularly mineral acids, are likewise advantageously employed. When preparing my new resins by concomitantly deesterifying a polyvinyl ester and condensing the deesterification product with aldehyde, simple acetals or α-halogenated ethers, the acid catalyst accelerates both deesterification and condensation. Hydrochloric acid and sulfuric acid are particularly useful. As catalysts which promote acetal condensations, but which are less useful as deesterification catalysts, zinc chloride and phosphoric acid may be mentioned.

As deesterifying agents, alcohols, particularly primary alcohols of the formula $C_nH_{2n+1}OH$ wherein $n$ represents 1, 2, 3 or 4, are advantageously employed. Aqueous organic acids, particularly aqueous lower aliphatic organic acids, such as aqueous acetic and aqueous propionic acids, for example, are also advantageously employed as deesterifying agents, particularly when employing formaldehyde.

As shown in the foregoing examples, an excess of aldehyde or of aldehyde plus simple acetal or halogen ether is advantageously employed in order to obtain resins low in hydroxyl group content. Excesses of from 25 to 200 or 300 percent are advantageously employed.

As simple acetals, I can employ any acetal of a monohydric alcohol (for example ethyl, butyl or benzyl alcohols) and a saturated aliphatic aldehyde which may or may not be halogenated.

For the preparation of film or sheet intended as a support for light-sensitive photographic coatings, I have found that my new resins advantageously have an ester group content equal to not more than about 10 per cent by weight of polyvinyl ester and a hydroxyl group content equal to not more than about 15 per cent by weight of polyvinyl alcohol. More advantageously the ester group content is about 3 per cent or lower and the hydroxyl group content about 10 per cent or lower. Polyvinyl acetaldehyde-monochloracetaldehyde acetal resins in which from about ten to about seventy mole per cent of the total acetal groups are monochloracetaldehyde acetal groups and the ester group and hydroxyl group contents of which are within the advantageous ranges set forth above are particularly useful resins for manufacturing film or sheet.

To prepare film or sheet from any new resins, I first dissolve about 1 part of the resin in from 2½ to 4½ parts of acetone or a mixture of 90% (by volume) of acetone and 10% methyl alcohol or ethylene dichloride. Such a solution is then cast onto a film-forming surface, such as a metal or glass plate or a revolving drum to desired thickness and the resulting film or sheet is allowed to dry. Drying may be facilitated by blowing warm air over the drying film or sheet. When sufficiently dry, the film or sheet is stripped from the film-forming surface and "cured" by treating with warm air. The "curing" removes the residual solvent, giving a transparent film or sheet of low water susceptibility and low thermoplasticity. The resulting film or sheet can be coated directly with photographic emulsions or can be coated first with resinous or other known "subbing" materials before the photographic emulsion is applied.

The following table shows the moisture susceptibility of representative of my new resins as compared with simple polyvinyl acetaldehyde acetal resins.

| Resin | Melting point | Hydroxyl | Acetate | Moisture susceptibility (swell and shrink amplitude) |
|---|---|---|---|---|
| Polyvinyl acetaldehyde acetal | °C. About 125 | 13.8 | 1.7 | 1.00 |
| Do | About 125 | 9.4 | 2.2 | 0.68 |
| Example 3 | 139 | 3.4 | 3.8 | 0.06 |
| Example 5 | 147 | 6.8 | 1.9 | 0.27 |
| Example 6 | 146 | 8.9 | 1.7 | 0.26 |

The foregoing data show that when in contact with moisture, the polyvinyl acetaldehyde acetal resins have a swell and shrink amplitude of 0.68 to 1.00 owing to the moisture absorbed, whereas my new resins have a much smaller swell and shrink amplitude of 0.06 to 0.26.

My new resins can be pressed into blocks and skived to thin sheets or layers which can be used as a laminating material, e. g. between sheets of glass, particularly if suitably plasticized. My new resins are compatible with a number of plasticizers, such as tributylphosphate, triphenylphosphate, tricrysylphosphate, diamylphthalate, dibutylphthalate, di- and triglycerol esters, such as acetates, propionates, butyrates and the like, monochloronaphthalene or the like. Amino and phenolic stabilizers can be incorporated in my new resins if desired.

My new resins can be successfully molded or extruded when suitably plasticized.

What I claim as my invention and desire to be secured by Letters Patent of the United States is:

1. A polyvinyl saturated aliphatic aldehyde acetal resin in which at least a part of the acetal linkages are formed from saturated aliphatic aldehyde acetal groups having not more than two halogen atoms in the alpha position.

2. A polyvinyl saturated aliphatic aldehyde acetal resin in which at least a part of the acetal linkages are formed from saturated aliphatic aldehyde acetal groups having not more than two chlorine atoms in the alpha position.

3. A polyvinyl saturated aliphatic aldehyde acetal resin in which at least about five mole per cent of the acetal linkages are formed from saturated aliphatic aldehyde acetal groups having not more than one halogen atom in the alpha position.

4. A polyvinyl saturated aliphatic aldehyde acetal resin in which at least about five mole per cent of the acetal linkages are formed from saturated aliphatic aldehyde acetal groups having not more than one chlorine atom in the alpha position.

5. A polyvinyl aliphatic aldehyde acetal resin in which at least about five mole per cent of the acetal linkages are formed from monochloracetaldehyde acetal groups and the remainder are formed from acetaldehyde acetal groups.

6. A polyvinyl aliphatic aldehyde acetal resin in which at least about five mole per cent of the acetal linkages are formed from monochloracetaldehyde acetal groups and the remainder are formed from propionaldehyde acetal groups.

7. A polyvinyl aliphatic aldehyde acetal resin in which at least about five mole per cent of the acetal linkages are formed from monochloracetaldehyde acetal groups and the remainder are formed from normal butyraldehyde acetal groups.

8. A polyvinyl saturated aliphatic aldehyde acetal resin in which at least a part of the acetal linkages are formed from saturated aliphatic aldehyde acetal groups having not more than one halogen atom in the alpha position, said resin having a hydroxyl group content equivalent to not more than about fifteen per cent by weight of polyvinyl alcohol.

9. A polyvinyl saturated aliphatic aldehyde acetal resin in which at least a part of the acetal linkages are formed from saturated aliphatic aldehyde acetal groups having not more thn one halogen atom in the alpha position, said resin having a hydroxy group content equivalent to not more than about fifteen per cent by weight of polyvinyl alcohol and an ester group content equivalent to not more than about ten per cent by weight of polyvinyl ester.

10. A polyvinyl saturated aliphatic aldehyde acetal resin in which from about ten to about seventy mole per cent of the total acetal linkages are formed from monochloracetaldehyde acetal groups and the remainder of the acetal linkages from acetaldehyde acetal groups.

11. A polyvinyl saturated aliphatic aldehyde acetal resin in which from about ten to about seventy mole per cent of the total acetal linkages are formed from monochloracetaldehyde acetal groups and the remainder of the acetal linkages are formed from acetaldehyde acetal groups, said resin containing a hydroxyl group content equivalent to not more than about ten per cent by weight of polyvinyl alcohol and an acetate group content equivalent to not more than about three per cent by weight of polyvinyl acetate.

12. A transparent film or sheet made from the resin of claim 1.

13. A transparent film or sheet made from the resin of claim 3.

14. A transparent film or sheet made from the resin of claim 5.

15. A transparent film or sheet made from the resin of claim 6.

16. A transparent film or sheet made from the resin of claim 7.

17. A transparent film or sheet made from the resin of claim 11.

18. A process for preparing a polyvinyl saturated aliphatic aldehyde acetal resin comprising deesterifying a polyvinyl ester and condensing the deesterified product with a non-halogenated saturated aliphatic aldehyde and with a saturated aliphatic aldehyde having not more than two halogen atoms in the alpha position, in the presence of an acid deesterification catalyst.

19. A process for preparing a polyvinyl saturated aliphatic aldehyde acetal resin comprising deesterifying a polyvinyl ester and condensing the deesterified product with a non-halogenated saturated aliphatic aldehyde and with a simple acetal of a saturated aliphatic aldehyde having not more than two halogen atoms in the alpha position, in the presence of an acid deesterification catalyst.

20. A process for preparing a polyvinyl saturated aliphatic aldehyde acetal resin comprising reacting a polyvinyl acetate with acetaldehyde and with the diethyl acetal of monochloracetaldehyde, in the presence of a deesterifying agent of the formula $C_nH_{2n+1}OH$ wherein $n$ represents a positive integer of from one to four, and in the presence of hydrochloric acid.

DONALD R. SWAN.